United States Patent
Hermes et al.

(10) Patent No.: US 9,163,671 B2
(45) Date of Patent: Oct. 20, 2015

(54) CONNECTING DEVICE

(71) Applicant: TRACTO-TECHNIK GmbH & Co. KG, Lennestad (DE)

(72) Inventors: Stefan Hermes, Lennestadt (DE); Sebastian Fischer, Lennestadt (DE)

(73) Assignee: TRACTO-TECHNIK GmbH & Co. KG, Lennestadt (DE)

( * ) Notice: Subject to any disclaimer, the term of this patent is extended or adjusted under 35 U.S.C. 154(b) by 0 days.

(21) Appl. No.: 14/109,349

(22) Filed: Dec. 17, 2013

(65) Prior Publication Data

US 2014/0186107 A1 Jul. 3, 2014
US 2015/0056010 A9 Feb. 26, 2015

(30) Foreign Application Priority Data

Dec. 27, 2012 (DE) .................. 10 2012 025 187

(51) Int. Cl.
*F16D 1/02* (2006.01)
*F16D 1/04* (2006.01)
*F16D 1/06* (2006.01)
*F16D 1/08* (2006.01)
*E21B 17/046* (2006.01)

(52) U.S. Cl.
CPC ............... *F16D 1/02* (2013.01); *E21B 17/046* (2013.01); *F16D 1/04* (2013.01); *F16D 1/06* (2013.01); *F16D 1/0876* (2013.01); *F16D 2001/062* (2013.01); *Y10T 403/68* (2015.01)

(58) Field of Classification Search
CPC ....... F16D 1/08; F16D 1/0829; F16D 1/0835; F16D 1/0786; F16D 1/04; E21B 17/02; E21B 17/043; E21B 17/0426

USPC .............. 403/355, 356, 359.1, 319, 316, 318; 285/91, 92, 81, 90

See application file for complete search history.

(56) References Cited

U.S. PATENT DOCUMENTS

| 3,073,635 | A  | * | 1/1963  | Schaefer ........................ 403/24 |
| 3,279,835 | A  | * | 10/1966 | Krohm ........................ 403/326 |
| 3,356,393 | A  | * | 12/1967 | Casanov ........................ 403/356 |
| 3,830,577 | A  | * | 8/1974  | Rampe et al. ................. 403/378 |
| 4,240,652 | A  | * | 12/1980 | Wong et al. ..................... 285/91 |
| 4,363,603 | A  | * | 12/1982 | Petersen ................... 416/244 R |
| 4,767,310 | A  | * | 8/1988  | Neumann et al. ............. 425/469 |
| 5,060,740 | A  |   | 10/1991 | Yousef et al. |
| 6,520,547 | B2 | * | 2/2003  | Robinson ...................... 285/330 |
| 7,559,582 | B2 | * | 7/2009  | Evans et al. ................... 285/333 |
| 8,136,216 | B2 | * | 3/2012  | Evans et al. ..................... 29/456 |
| 8,690,200 | B1 | * | 4/2014  | Patterson, Jr. ................. 285/403 |
| 2003/0166418 | A1 | * | 9/2003 | Wentworth et al. ............. 464/18 |
| 2008/0099242 | A1 | * | 5/2008 | Tjader ............................ 175/50 |
| 2013/0164081 | A1 | * | 6/2013 | Hermes et al. ................ 403/343 |

FOREIGN PATENT DOCUMENTS

| DE | 19608980 A1 | 9/1997 |
| DE | 19803304 A1 | 12/1998 |
| EP | 0324442 B1  | 3/1992 |
| EP | 0660004 A1  | 6/1995 |
| WO | 2006092649 A1 | 9/2006 |

* cited by examiner

Primary Examiner — Daniel Wiley
(74) Attorney, Agent, or Firm — Howard IP Law Group, PC

(57) ABSTRACT

A connecting device with a drive section having a thread on the end, wherein the connecting device can be used to screw a shaft element to a thread corresponding to the thread of the drive section, wherein, in addition to the thread, at least one positive-locking element forming a positive-locking connection with the shaft element is provided.

11 Claims, 3 Drawing Sheets

CONNECTING DEVICE

FIELD OF THE INVENTION

The invention relates to a connecting device, particularly for an excavation work device, with a drive section having a thread on the end.

BACKGROUND

The term "excavation work device" according to the invention is understood to refer to devices that can be used to transfer the drive power of a drive device to a tool, via a linkage, that is arranged at a linkage. This includes, in particular, auger devices that can be used to make drill holes, and particularly horizontal holes, in the ground. In doing so, thrust or compressive forces and a drive torque are normally transferred from the drive device to the tool, which is in the form of a drill head, via the linkage of the auger device. There are, however, also excavation work devices with which only thrust or tractive forces are transferred to a corresponding tool via the linkage. These include, in particular, those excavation work devices that can be used to expand existing drill holes in the ground or previously laid old lines, or to remove them, and any new pipework can be laid at the same time. Often, the excavation work devices are designed such that they can be used both for creating the auger holes as well as for pulling work, i.e. for expanding an existing hole or an old line for placing new pipework. This makes it possible to initially create a pilot drill hole with the same excavation work device, during which a pilot drill head is operated so as to thrust through the ground until it reaches a target excavation pit and the pilot drill head is replaced in the excavation pit by an expanded head, by means of which the pilot drill hole is expanded while the drill linkage is being pulled out. As an option, a new pipe, which is attached to the expanded head, can be placed into the expanded ground drill hole at the same time as the expanded head.

The term "drive section" according to the invention refers to an attachment or a connecting and/or screw element for a drive, for example a linear motor or a torque motor, of a device, or particularly an excavation work device. The drive section can be, for example, a connecting element screwed onto a drive shaft of a torque motor. The drive can generate the thrust, compressive, and tractive forces as well as a torsional force or torque required for the device to work. The tractive force is required, for example, during the placement of a new pipe for an excavation work device. The transfer of the torque is important, for example, for a ground drilling system in the horizontal drilling sector.

The linkage of such types of excavation work devices normally consists of a plurality of linkage segments that are connected to one another, in stages, depending on the drilling propulsion. The individual linkage segments are connected via a coupling element in that, in addition to the plug couplings, as described in DE19608980 A1, screw connections, in particular, are widely used. The significant advantages of screw connections are the low costs that are associated with their production as well as the possibility of automating the screw-on process that is to be executed, in a simple manner. A significant disadvantage of screw connections, however, is that they often represent the weakest points in the linkage, which is due to the relatively small diameter in the area of the threaded plug of the threaded connection as well as to the large notch effect of the thread itself due to its geometry.

Known types of threads that are used for the linkages of excavation work devices are API threads as well as round threads in accordance with DIN 20400. The service life of such types of thread shapes, however, has proven to be insufficient in the daily operation of excavation work devices.

Therefore, alternative thread shapes have been developed that are specially designed for the specific linkage loads occurring with excavation work devices. DE19803304 A1 discloses a thread connection that is intended to connect the linkage segments of a drill linkage in which the drill linkage is intended to be used for rotary percussion drilling. The essential details of these thread connections are the asymmetrical shape of the thread with different gradient angles of the load-bearing and the non-load-bearing flanks in rotary percussion drilling as well as the provision of a non-threaded lead section. In addition, the non-load-bearing flanks should be formed in a circular arc shape. The threaded connection known from DE19803304A1 has also been shown to be insufficiently robust in daily operation.

EP0324442B1 and U.S. Pat. No. 5,060,740A also disclose asymmetrical threaded connections that are designed for connecting the linkage segments of auger devices. The threaded connections disclosed in these printed documents are characterized in that the root of the thread forms a section of an ellipse. This is supposed to enable a transition from the root of the thread into the flat portion of the flanks of the thread in a manner that is as notch-free as possible.

WO2006/092649A1 also discloses threaded connections for the linkages of auger devices in which the thread root forms a section of an ellipse. The thread shapes disclosed in this printed document may be asymmetrical or symmetrical.

Furthermore, EP0660004A1 discloses self-tapping screws equipped with a thread. In order to reduce the notch effect in the thread root with the screws, the area of the transition of the thread root to the flank ascent is designed with a curved profile that has "a harmonic transition from a tangent, extending axially to the thread base, to an outward sloping flank section, forming an angle to the thread axis." FIG. 3 in EP0660004A1 shows a threaded profile curve forming a section of a horizontal ellipse in the area of the thread root.

SUMMARY

Starting from here as the prior art, the object of the invention is thus to provide an improved connection, particularly with regard to service life, in which the connection would have a longer service life particularly when used to connect a drive section and a shaft element of a linkage in an excavation work device and which would also provide, with the longer service life, the option for a quick exchange, i.e. would enable quick loosening and attaching, of the elements to be connected.

This object is achieved by the subject matters of the independent claims. Advantageous embodiments are the subject matter of the respective dependent claims and result from the following description of the invention.

The core of the invention provides that a tractive and/or compressive force to be applied be transferred via a thread, and a transfer of a torque take place via at least one positive-locking element of the connecting device. According to the invention, a clear separation of the forces to be transferred is achieved with the connecting device. Due to the use of at least one positive-locking element, the transfer of a torque is made possible, during which, furthermore, the use of at least one positive-locking element enables a type of "self-locking" to be achieved, thereby preventing the twisting or slipping of the connected element. There is essentially no loading of the thread in order to transfer a torque and likewise, essentially no loading of the at least one positive-locking element during transfer of the tractive and/or compressive force. Due to the separation of the transfer forces that is made possible, a simple and/or known thread, as well as a simply designed positive-locking element, may be used.

Surprisingly, it was shown that in the field of excavation work devices as well, i.e. even under harsh environmental conditions, during which the connection and/or the connecting device is subjected to moisture and soiling, a connecting device according to the invention may be used that connects a drive section, designed as a drilling shaft adapter for a linkage of an excavation work device, particularly of an auger device subjected to compression, traction, and impact, to the drive shaft of a rotation motor. If the at least one positive-locking element becomes worn due to the load during the rotation, it can be easily replaced. Production of the positive-locking elements is not complex, from a design perspective, and is possible using basic methods. Due to the transfer of torque from the at least one positive-locking element, the thread transferring the tractive and/or compressive forces can be shaped in a typical manner.

According to the invention, the connecting device has a drive section, a shaft element, and at least one positive-locking element. The drive section is equipped with a thread and formed as a plug-shaped element. Thus, the thread of the drive section is designed as an outer thread. The shaft element, which is designed as a sleeve, is designed with an (inner) thread that corresponds to the thread of the drive section and can be screwed onto the drive section. In addition to the thread, there is at least one positive-locking element forming a positive-locking connection with the sleeve. This achieves the separation of the forces to be transferred. While the thrust and/or tractive forces are transferred via the thread, the torque is transferred via the at least one positive-locking element.

The term "sleeve" refers, according to the invention, to a structural element here, particularly the shaft element, into which at least one further structural element—a plug-shaped structural element, for example the drive section—may be placed or inserted at one end. The sleeve can be designed in a circular shape at least in a subsection in the outer periphery.

The term "shaft element" according to the invention includes a structural element whose longitudinal axis extends in a working direction of the excavation work device—in the direction of the drilling hole—and to which, for example, a linkage of an excavation work device can be connected. The shaft element can serve as a drilling shaft adapter that enables the connection of a different linkage or linkage segments to the drive in that an adapted connection option is provided on the free end for the linkage. For the connecting element according to the invention, this means that there can be a plurality of replaceable shaft elements for one connecting device that differ due to the design on the free end of the shaft element. In general, the shaft element has a thread on the free end to connect with a linkage or a linkage segment. The thread on the free end of the shaft element is preferably designed as a conical thread to enable simple and quick screwing of a linkage segment with the shaft element according to the invention, i.e. the thread roots and/or the thread crests of the thread on the shaft element define a sheath on the free end that has a conical shape. The conical angle is preferably between 3° and 5°. The conical angle is understood to be the angle that is formed by the sheath to a line parallel to the longitudinal axis of the shaft element. In order to transfer drilling fluid, it is preferable for the shaft element to be hollow or designed with a center channel.

The term "positive-locking element," according to the invention, characterizes an element that can be used to form a positive-locking connection between the drive section and the shaft element. According to the invention, the positive-locking element is fastened to the shaft element or the drive section, or retained, or affixed thereto and is adapted to an opening in the drive section and/or the shaft element in order to form the positive-locking connection with its outer dimension. Adaptation in this case refers, in particular, to the adaptation of the dimension of the positive-locking element to the dimension of the opening, particularly a pass-through groove, transverse to the longitudinal axis of the drive section, because this dimension has the most importance for transferring the torque. In order to form the positive-locking connection, the positive-locking element is accordingly retained at one of the two (connecting) elements, for example in the form of a blind hole, and locks into an opening of the other (connecting) element, particularly a pass-through groove of the shaft element.

The drive section has an outer thread and the shaft element has a corresponding inner thread, which means that the drive section is "routed" into the shaft element, thus establishing sufficient stability in the connection with reliable transfer of the effective forces. This stability in the connection increases the service life of the connection and the connecting elements. In addition, a simple connection of an excavation work device can also be made on-site.

Preferably, the at least one positive-locking element, which can be detached via a sleeve that can be pushed over the shaft element, is retained on the drive section, thereby enabling the positive-locking element to be replaced should it become worn. The elements to be connected, i.e. the drive section and the shaft element, can continue to be used and the replacement only consists of a component that is easy to produce, the positive-locking element.

It is preferable if the at least one positive-locking element forms an angle of less than 20°, in its longitudinal direction, with the longitudinal axis of the shaft element, thereby the effective area of the positive-locking connection is enlarged and optimized for transferring the torque. In a particularly preferred embodiment, the positive-locking element is in the shape of a rectangle and, when the connection is established, its longitudinal axis is aligned such that the longitudinal axis of the positive-locking element is essentially parallel to longitudinal axis of the shaft element, thereby resulting in a maximum "effective surface area."

In a preferred embodiment, the at least one positive-locking element can be inserted into a pass-through groove in the sleeve and is adapted to the dimensions of the pass-through groove for the positive-locking connection. The positive-locking element can be designed as an adapted element. Due to the design of the pass-through groove, the positive-locking element can also be accessed from the exterior even once the connection has been established. The positive-locking connection can be detached from the exterior. To this end, the positive-locking element can be removed from the pass-through groove or, for example, pressed out of the pass-through groove when force is applied.

For uniform distribution of the load during the transfer of torque, it is preferable if a plurality of pass-through grooves and positive-locking elements are provided. The uniform distribution to a plurality of positive-locking elements will reduce the wear to a positive lock-locking element. The service life of an individual positive-locking element for forming the connection will be increased. To further increase the service life, the plurality of pass-through grooves may be evenly distributed around the periphery of the drive section. It is especially preferable if the angles are essentially at equidistant intervals between the pass-through grooves and/or positive-locking elements accordingly.

It is preferable if the at least one positive-locking element is retained on the drive section via a sleeve that can be pushed over the shaft element. The sleeve can be secured at a specific position using a retaining ring and the positive-locking element can be retained in the pass-through groove at the drive section. To this end, the drive section may have one or more (blind) holes into each of which one positive-locking element can be inserted and by means of which the sleeve can be retained, making contact, on the drive section. Due to the design of a (reversible) simple insertion of at least one positive-locking element that is secured or retained by means of a different (retaining) sleeve, a simple, from a design perspective, detachable connection is made possible between the drive section and the shaft element to transfer a torque, and this connection represents a reliable and strong connection. The positive-locking connection can be created with simple means and then detached again in the event that the shaft element would need to be replaced.

Preferably, the drive section has a recess adapted to the surface of the positive-locking element for the at least one positive-locking element in which the at least one positive-locking element can be retained. The formation of a recess, adapted to the positive-locking element, in the drive section to which it can be retained, enables the formation of contact surfaces that extend transverse to the load direction during the transfer of a torque and thus can accommodate the forces acting on the positive-locking element and/or can support the positive-locking element. The service life of the connecting device is further increased due to the reduction in the load by means of the support.

For the connection of the drive section with the drive, the drive section has a further threaded section, preferably spaced away from the threaded section at the end—that is, on the other end. It may also be preferable for the drive section to have teeth on the end spaced away from the threaded section—teeth on the front and/or teeth formed around the outer periphery—for the drive, for example a drive shaft of a torque motor.

In order to design the threaded connection equally for compressive as well as tractive loads, there can be a further provision that the interior thread of the shaft element and optionally the outer thread of the drive section, as well as the thread on the free end of the shaft element of the connecting device according to the invention, be designed symmetrically. This can be especially preferably achieved in that adjacent flanks of a thread of the shaft form sections of the same ellipse. The elliptical shape of this one ellipse can also be further expanded to the thread base so that both flanks and the thread base of a complete thread form one and the same ellipse. Such an embodiment of the inner thread of the shaft element can have a particularly uniform tension distribution for both compressive as well as tractive loads. With a corresponding outer thread of the drive section for this and/or with the threaded bushing of a linkage segment to be connected with the shaft element, there may be a provision that the two flanks of a thread profile form sections of one and the same ellipse. However, it is preferable in this case if the thread crest is flattened.

The connecting device according to the invention is particularly suitable for use for connecting linkage segments of a linkage of an excavation work device with a drive of an auger device particularly subjected to compression, traction, and impact, such as, for example, a horizontal drilling device, that can also be use for placing new pipes and/or for expanding pilot drill holes. It is preferable if the individual linkage segments for this are connected to said device on the free end of the shaft element.

BRIEF DESCRIPTION OF THE FIGURES

The invention is explained in more detail in the following by means of an exemplary embodiment shown in the drawings.

The drawings show the following.

DETAILED DESCRIPTION

Figure 1:
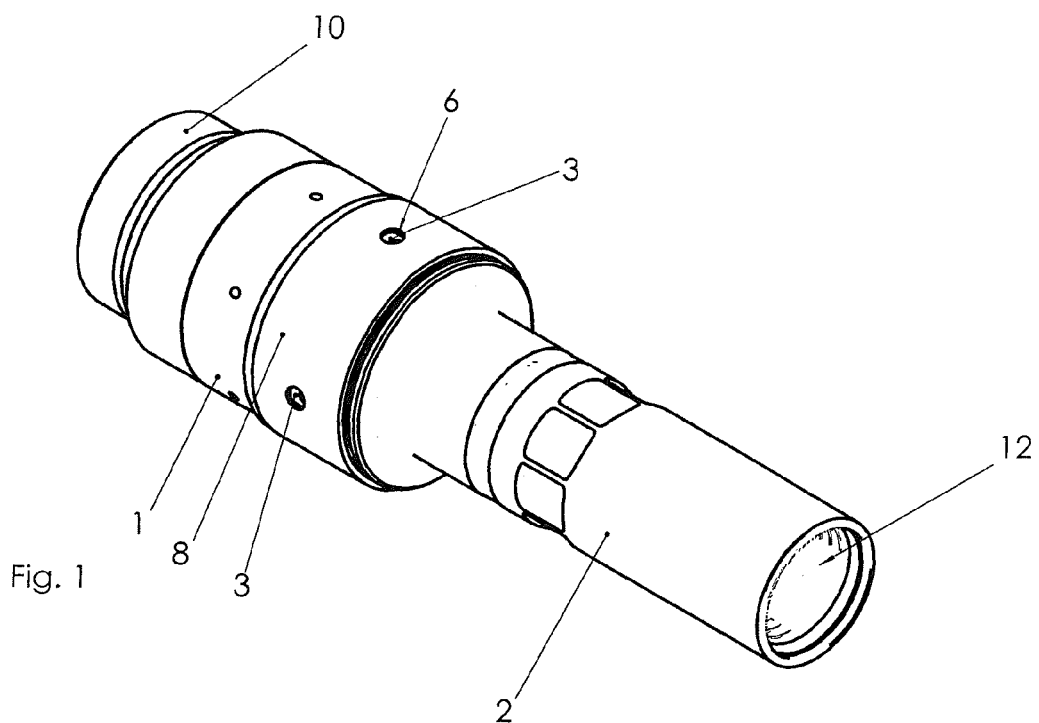
FIG. 1 shows a connecting device according to the invention with a drive section and a shaft element in a schematic isometric representation.
Figure 2:
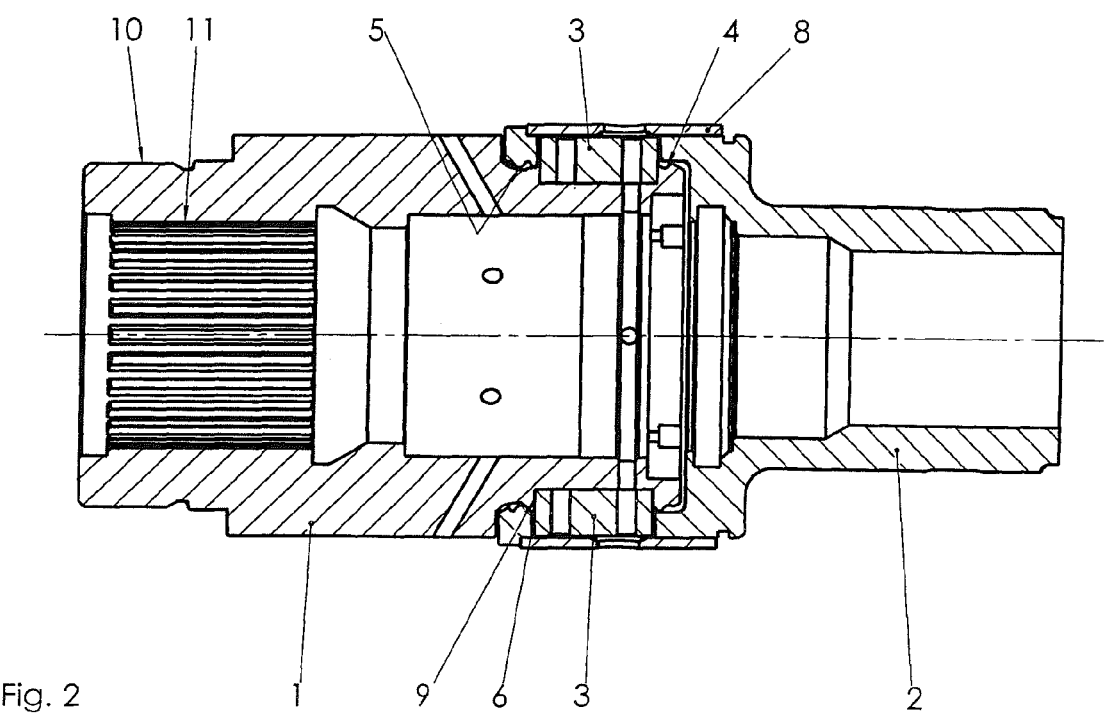
FIG. 2 shows a partial view of FIG. 1 as a longitudinal cross-section in an enlarged representation.
Figure 3:
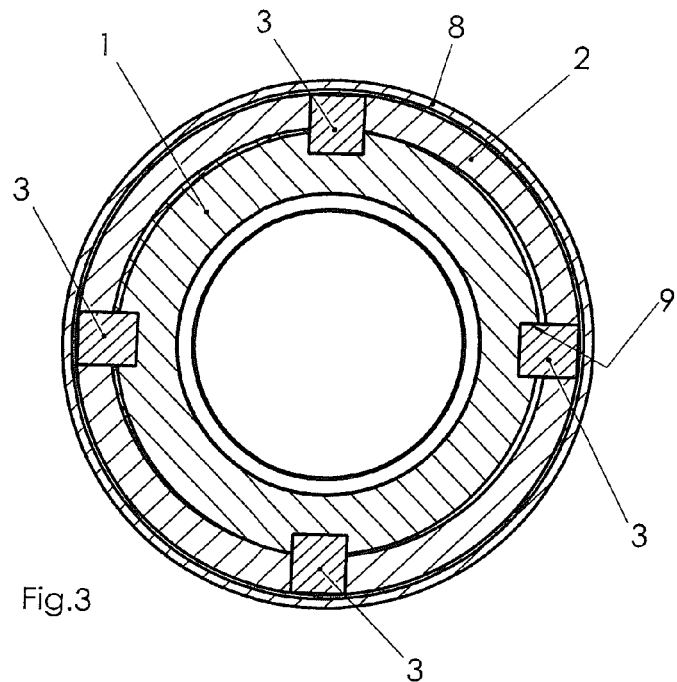
FIG. 3 is a view of FIG. 1 in an enlarged cross-sectional representation from the front in the area of a positive-locking connection between the drive section and shaft element.
Figure 4:
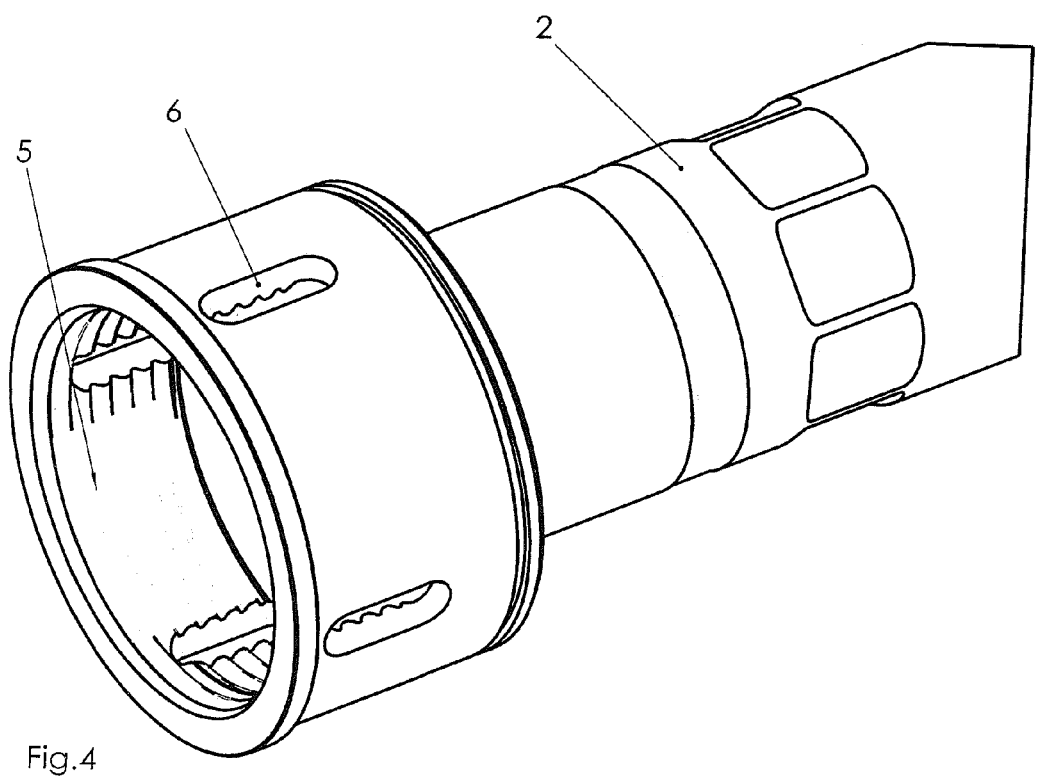
FIG. 4 is an enlarged representation of one end of the shaft element in FIG. 1.

FIGS. 1 to 4 show a connecting device according to the invention having the three elements. The connecting device according to the invention comprises a drive section 1 designed as a plug, a shaft element 2 designed as a drilling shaft adapter, and at least one positive-locking element 3.

The drive section 1 has a thread 4 designed as an outer thread. The shaft element 2 has an inner thread 5 that corresponds to the thread 4. The inner thread 5 is located on the end of the shaft element 2. The shaft element 2 is screwed onto the drive section 1 formed as a plug with its inner thread 5 on its end in order to form a connection.

A positive-locking connection can be established between the drive section 1 and the shaft element 2 with the at least one positive-locking element 3. The four positive-locking elements 3 shown in the exemplary embodiment are retained on the drive section 1 in the shaft element 2. In order to form the positive-locking connection, there are pass-through grooves 6 in the shaft element 2 into which the positive-locking elements 3 are inserted and retained, making contact with the drive section 1. The pass-through grooves 6 are adapted to the outer shape, i.e. particularly the side surfaces of the positive-locking elements 3, and making contact with them in order to form the positive-locking connection. The positive-locking elements 3 on the drive section 1 are retained in the pass-through grooves 6 via a sleeve 8, which is pushed over the shaft element 2 and/or the pass-through grooves 6 formed therein. The sleeve 8 is retained in a specific position, in which the sleeve at least partially covers the pass-through grooves, by means of a retaining ring.

There is a recess 9 on the drive section 1 in the area of the surface intended for contact of the positive-locking element 3 for each positive-locking element 3. The dimensions of the recess 9 are such that the positive-locking element 3 is retained in the recess 9 by means of its side surfaces in a positive-locking manner.

In the exemplary embodiment shown, the pass-through grooves 6 are evenly spaced around the periphery of the drive section 1 or shaft element 2. The thickness of the positive-locking elements 3 is preferably such that the positive-locking elements 3 have a dimension transverse to the longitudinal axis of the drive section 1 that is defined such that the positive-locking elements 3 extend up to the sleeve 8 making contact with the drive section 1.

A thread and teeth 11 are provided on the end in the form of an outer thread 10 for a connection of the drive section 1 to a drive. The drive section 1 can be placed on a drive shaft of the torque motor with teeth 11, thereby achieving a rotational linkage. For axial retention, a nut adapted to the outer thread 10 can be placed over this.

Figure 5:
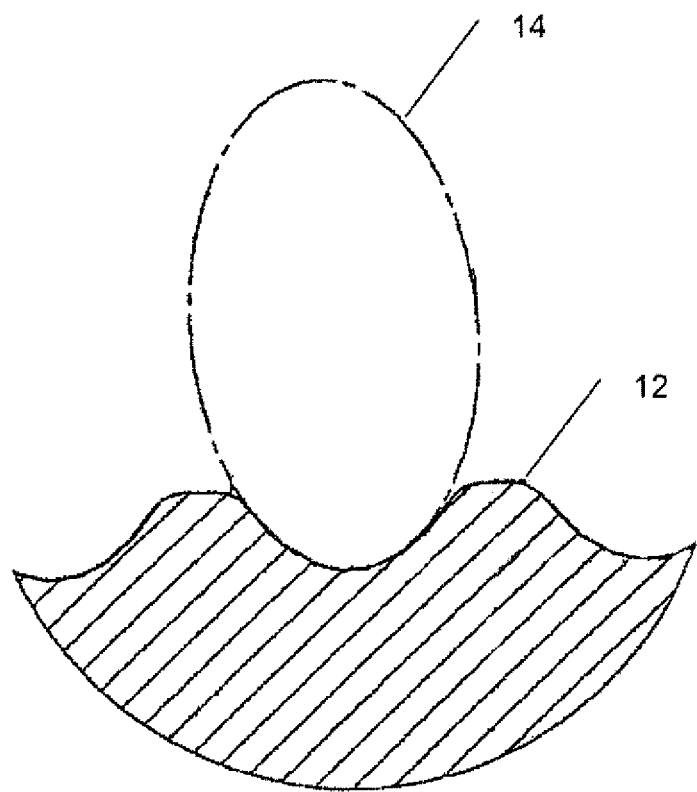
FIG. 5 is a partial cross-section view of symmetrical threads, wherein adjacent flanks and the thread root form sections of the same ellipse.

FIG. 1 shows that the shaft element 2 has a thread 12 on the free end, i.e. away from the drive section 1. The thread 12 has a symmetrical outer thread applied to a core with which adjacent flanks and the thread root form sections of the same ellipse 14, as shown in FIG. 5.

The invention claimed is:

1. A connecting device comprising:
   a drive section having a thread, wherein the drive section thread is configured to screw onto a thread of a shaft element, and
   wherein at least one positive-locking element is provided within an area of the threads of the drive section and the shaft element, the positive-locking element configured to form a positive-locking connection between the drive section and the shaft element, the positive-locking element being sized to engage with an elongated opening extending in an axial direction through the thread of at least one of the drive section and the shaft element, and also to engage a recess in the other of the drive section and the shaft element in order to form the positive-locking connection,
   wherein the elongated opening and the positive-locking element are sized such that no load is placed on the positive-locking element during the transfer of at least one of axially tractive or compressive forces between the drive section and the shaft element.

2. The connecting device according to claim 1, wherein the thread of the drive section comprises an outer thread and the thread of the shaft element comprises a corresponding inner thread.

3. The connecting device according to claim 1, wherein the at least one positive-locking element is fastened in the shaft element so as to be detachable.

4. The connecting device according to claim 1, wherein a longitudinal axis of the at least one positive-locking element forms an angle of less than 20° to a longitudinal axis of the shaft element.

5. The connecting device according to claim 1, wherein the elongated opening comprises a pass-through groove formed in the shaft element.

6. The connecting device according to claim 5, wherein the pass-though groove comprises a plurality of pass-through grooves and the at least one positive-locking element comprises a plurality of positive-locking elements.

7. The connecting device according to claim 6, wherein the pass-through grooves are distributed evenly around the periphery of the shaft element.

8. The connecting device according to claim 5, further comprising:
   a sleeve for retaining the at least one positive-locking element in the pass-through groove; and
   a retaining ring for securing the position of the sleeve relative to the at least one positive-locking element.

9. The connecting device according to claim 1, wherein the thread of the drive section comprises an outer thread formed on a first end thereof.

10. The connecting device according to claim 9, wherein the drive section has teeth on a second end thereof for connecting with a drive.

11. The connecting device according to claim 10, wherein the outer thread of the drive section comprises threads symmetrically placed on a core with which adjacent flanks and the thread root of a thread form sections of the same ellipse.

* * * * *